United States Patent [19]
Boyden et al.

[11] 3,832,623
[45] Aug. 27, 1974

[54] INVERTER-CONVERTER POWER SUPPLY SYSTEM

[75] Inventors: Willis Guild Boyden; Richard Astourre Shaw, both of Norwood, Mass.

[73] Assignee: North American Electronics Corporation, Norwood, Mass.

[22] Filed: Nov. 17, 1972

[21] Appl. No.: 307,504

[52] U.S. Cl. .................................... 321/45 R
[51] Int. Cl. .................................... H02m 7/52
[58] Field of Search .............. 321/45 R; 331/113.1

[56] References Cited
UNITED STATES PATENTS

| | | | |
|---|---|---|---|
| 2,892,103 | 6/1959 | Scarbrough | 321/45 R |
| 3,008,068 | 11/1961 | Wilting et al. | 321/45 R |
| 3,319,180 | 5/1967 | Mesenhimer | 321/45 R X |
| 3,319,180 | 5/1967 | Mesenhimer | 321/45 R |
| 3,333,172 | 7/1967 | Brailsford | 331/113.1 |
| 3,354,270 | 11/1967 | Smith et al. | 331/113.1 X |
| 3,390,322 | 6/1968 | Rogers | 321/45 R X |
| 3,418,559 | 12/1968 | Rolfes | 321/45 R |
| 3,432,737 | 3/1969 | Hunter et al. | 321/45 R X |
| 3,441,831 | 4/1969 | Goto et al. | 321/45 R |
| 3,465,231 | 9/1969 | Hyde | 321/45 X |
| 3,569,816 | 3/1971 | Marzolf | 321/2 |
| 3,579,077 | 5/1971 | Cameron | 321/18 |

Primary Examiner—William M. Shoop, Jr.
Attorney, Agent, or Firm—Martin Kirkpatrick

[57] ABSTRACT

An inverter-converter power supply system with bistable means to alternately gate a pair of switching transistors, the transistors controlling current flow through opposite halves of a transformer winding from a DC voltage source. The transistors are cross-coupled by series connected RC circuits for rapid de-saturation and overload protection, while excessive transistor base voltage levels are prevented by diodes connected between the transistor bases and ground.

1 Claim, 1 Drawing Figure

PATENTED AUG 27 1974 3,832,623
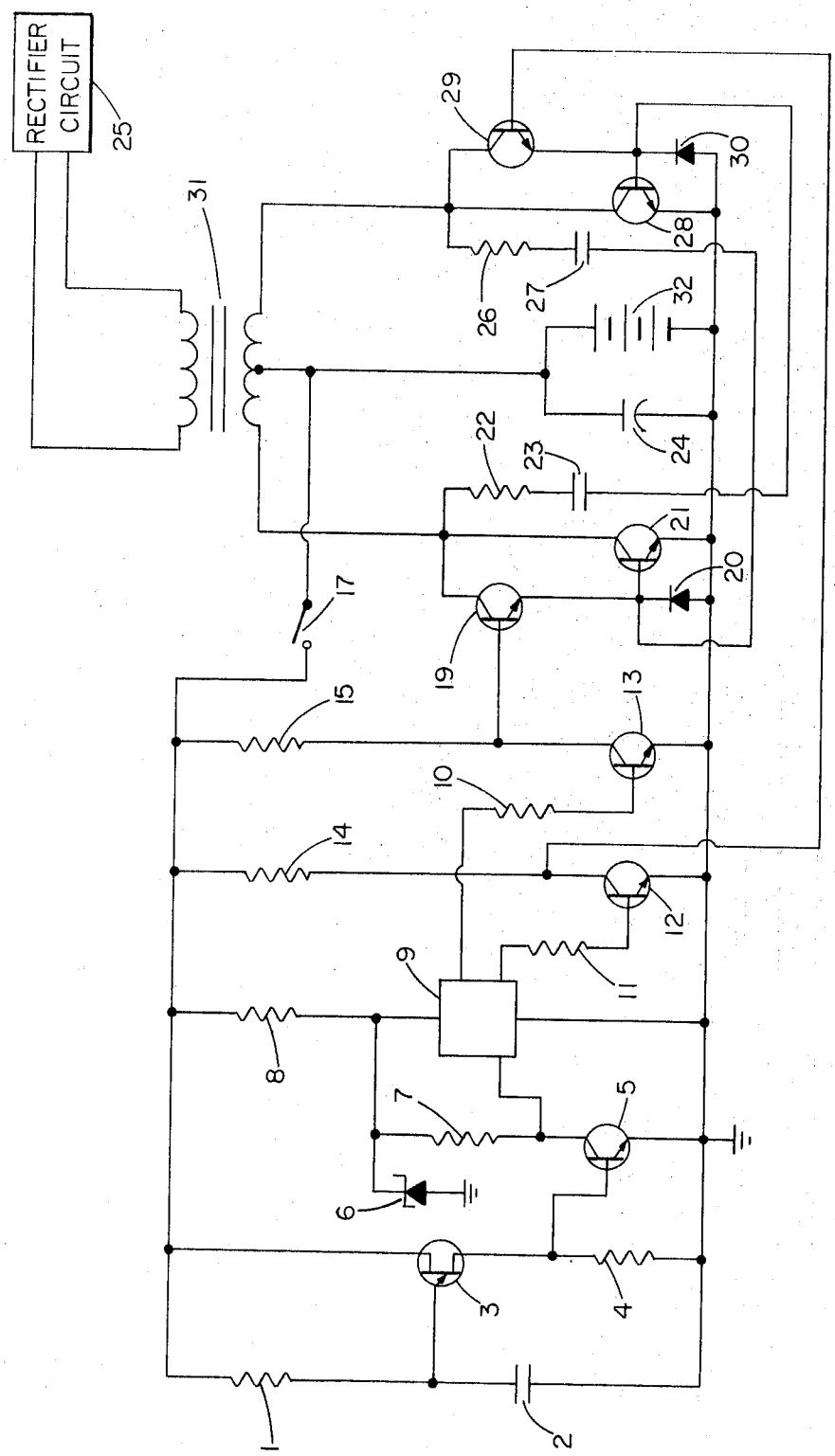

INVERTER-CONVERTER POWER SUPPLY SYSTEM

The herein described inverter-converter was developed essentially to increase the quality of sound produced by automotive tape-player systems that operate from a 12 volt battery, yet it can be used by any electronic equipment that would benefit from its voltage conversion capabilities.

Because of the low voltage that they operate from, present automotive electronic equipment are capable of only a limited power output. Consequently, their hi-fidelity and other performance capabilities are severly reduced. The herein described inverter-converter allows, for instance, automotive electronic amplifier equipment to deliver much more power, and consequently, greatly increases their hi-fidelity capabilities, by increasing the battery voltage to a considerably higher voltage. The accompanying drawing is an electronic symbol representation of the herein described embodiment.

An oscillator circuit, consisting of a timing resistor 1 and capacitor 2, a unijunction transistor 3, and a base resistor 4, generates a constant frequency pulse to transistor 5 which acts as a buffer. The flip flop 9, is either an integrated circuit or a combination of discreet components which will change its phase each time a pulse occurs at the clock input. Resistor 7 is used for pull-up and zener 6 keeps the flip-flop 9 supply voltage constant.

Resistors 10 and 11 are limiting resistors. The outputs from the flip-flop 9 are two square wave signals 180 degrees out of phase. Transistors 12 and 13 are amplifiers. Resistors 14 and 15 provide a constant current. Transistors 19 and 29 are driver transistors, and transistors 21 and 28 are the main switching transistors delivering an out of phase square wave signal to the transformer 31. Transistors 21 and 28 are respectively brought quickly out of saturation by the use of resistor 26 and capacitor 27 connected in series between the base of transistor 21 and the collector of transistor 28, and resistor 22 and capacitor 23 connected in series between the base of transistor 28 and the collector of transistor 21. The RC networks a high reverse current to the base of transistors 21 and 28 when the transistors are being switched. Diodes 20 and 30 are respectively connected between the bases of the switching transistors 21 and 28 and ground potential to prevent an excessive reverse voltage across the base-emitter junctions.

The transformer 31 is operated in an unsaturated mode and can be operated at a frequency above the audible range to eliminate acoustical noise caused by vibration in the transformer. The primary of the transformer 31 is center tapped, with the center-tap being connected to the battery 32 of the automotive system.

When switch 17 is closed, voltage is applied to the oscillator circuitry, causing the main current switching transistors 21 and 28 to deliver an out of phase, symetrical, square wave pulse of power to the transformer 31 which minimizes the direct current offset current in the transformer primary. The battery 32 may be replaced by an electronic power supply operating from an alternating current source. Capacitor 24 is used as a filter.

The secondary of transformer 31 can be rectified by a rectifier circuit 25 and filtered and regulated to provide a direct-current source of power which can be higher than the original source of power in the automotive system battery 3. This results in a reliable, noiseless converter that is capable of operating a high quality, high-fidelity amplifier or other electronic circuitry requiring higher direct current voltage.

The diodes 20 and 30 and resistors 22 and 26 are crucial in providing reliable operation at the relatively high voltage supplied by an automobile battery, typically 12 volts. Assuming that transistor 21 is cut off and transistor 28 is conducting, capacitor 23 will carry a voltage twice that of the battery. When the flip-flop 9 acts to gate transistor 21 into conduction, capacitor 23 will immediately begin to discharge through the transistor 21. Without the protective elements of this circuit, transistor 21 could be destroyed by the high voltage and current applied to it. In addition, a large reverse voltage would be present at the base of transistor 28 that could cause catastrophic destruction of the transistor 28. Resistor 22 limits the current applied to transistor 21, thus permitting that transistor to go immediately into saturation, and thereby reducing the power dissipation in transistor 21. When transistor 28 is de-saturated, the discharge current for capacitor 23 is supplied from ground potential through diode 30, thereby preventing any appreciable reverse base voltage at transistor 28. A similar sequence takes place for capacitor 27, resistor 26, and diode 20 when the flip-flop 9 again operates.

A center-tapped secondary or multiple secondaries may be used to provide more than one voltage.

The secondary voltage may also be used as a source of alternating current.

I claim:

1. A DC to AC voltage inverter comprising in combination:

a transformer having a center-tapped primary winding for connection to a source of DC voltage, a pair of switching transistors, the respective collector-emitter circuits of said transistors connected to opposite ends of said primary winding, bi-stable means connected to apply a gating signal alternately to the bases of the respective transistors, said switching transistors cross-coupled by a pair of RC circuits, each RC circuit comprising a capacitor connected in series with a resistor between the base of one of said transistors and the end of the primary transformer winding that is connected to the collector-emitter circuit of the other transistor, whereby each said capacitor is alternately charged during non-conduction of its collector-emitter connected transistor and discharged through its series connected resistor and collector-emitter connected transistor during conduction thereof, said discharge providing a de-saturating current for the said base connected transistor, said resistors limiting the power dissipation in said collector-emitter connected transistors, and a first diode connected between ground potential and the base of one of said switching transistors, and a second diode connected between ground potential and the base of the other of said switching transistors, said diodes completing a discharge circuit for said capacitors and thereby limiting the voltage level at said transistor bases.

* * * * *